June 13, 1967  W. D. RITCHIE  3,324,956
OPTIONALLY AND AUTOMATICALLY CONTROLLED REAR CASTER
WHEELS ON PRIME MOVER TRAILED VEHICLE ASSEMBLIES
Filed May 4, 1964  3 Sheets-Sheet 1

INVENTOR.
WILLIAM D. RITCHIE
BY
Smith & Mattern
ATTORNEYS

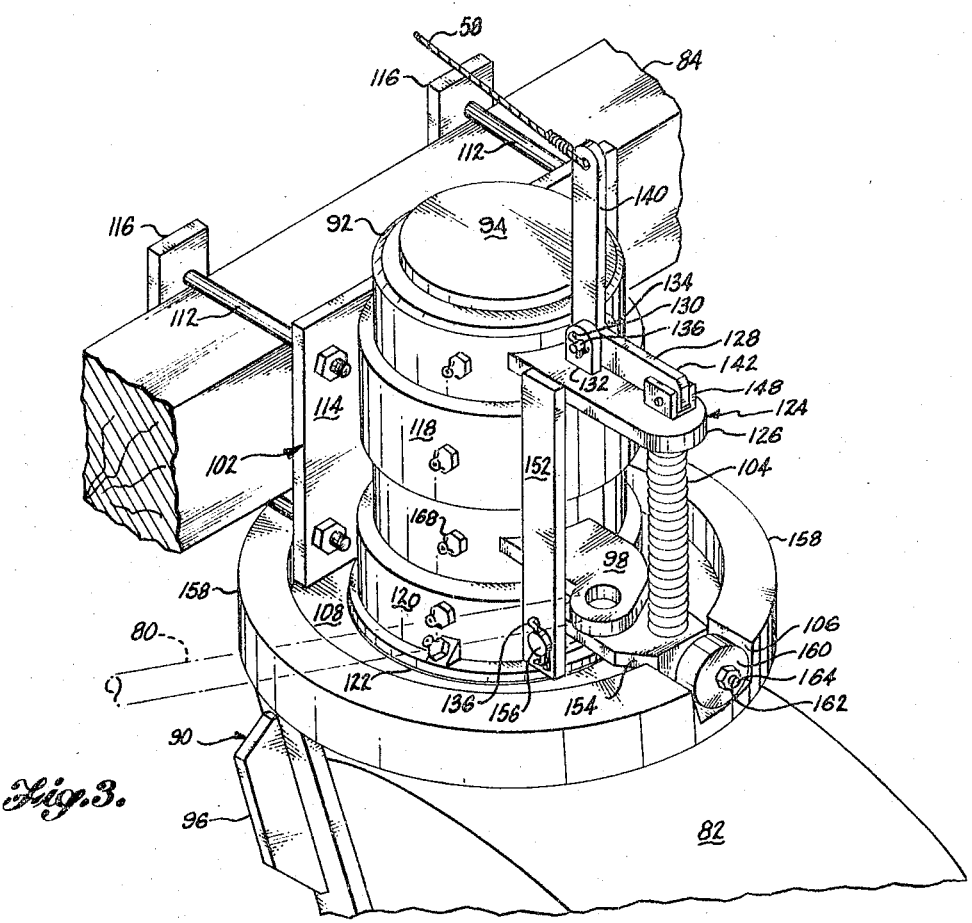
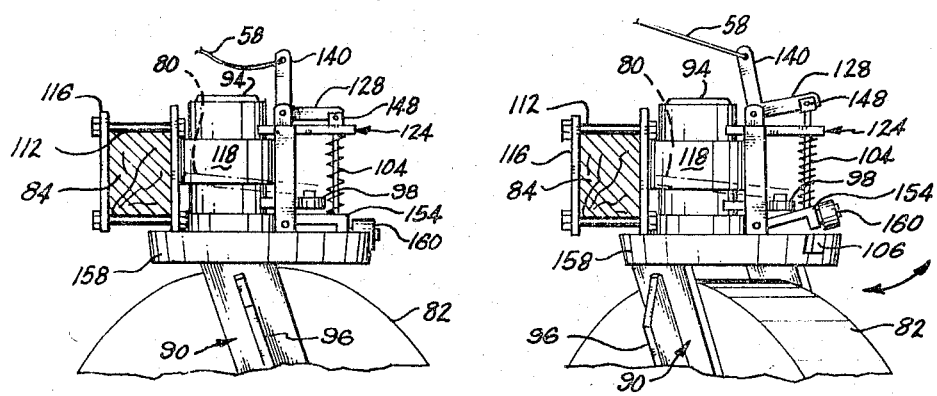

June 13, 1967 W. D. RITCHIE 3,324,956
OPTIONALLY AND AUTOMATICALLY CONTROLLED REAR CASTER
WHEELS ON PRIME MOVER TRAILED VEHICLE ASSEMBLIES
Filed May 4, 1964 3 Sheets-Sheet 2
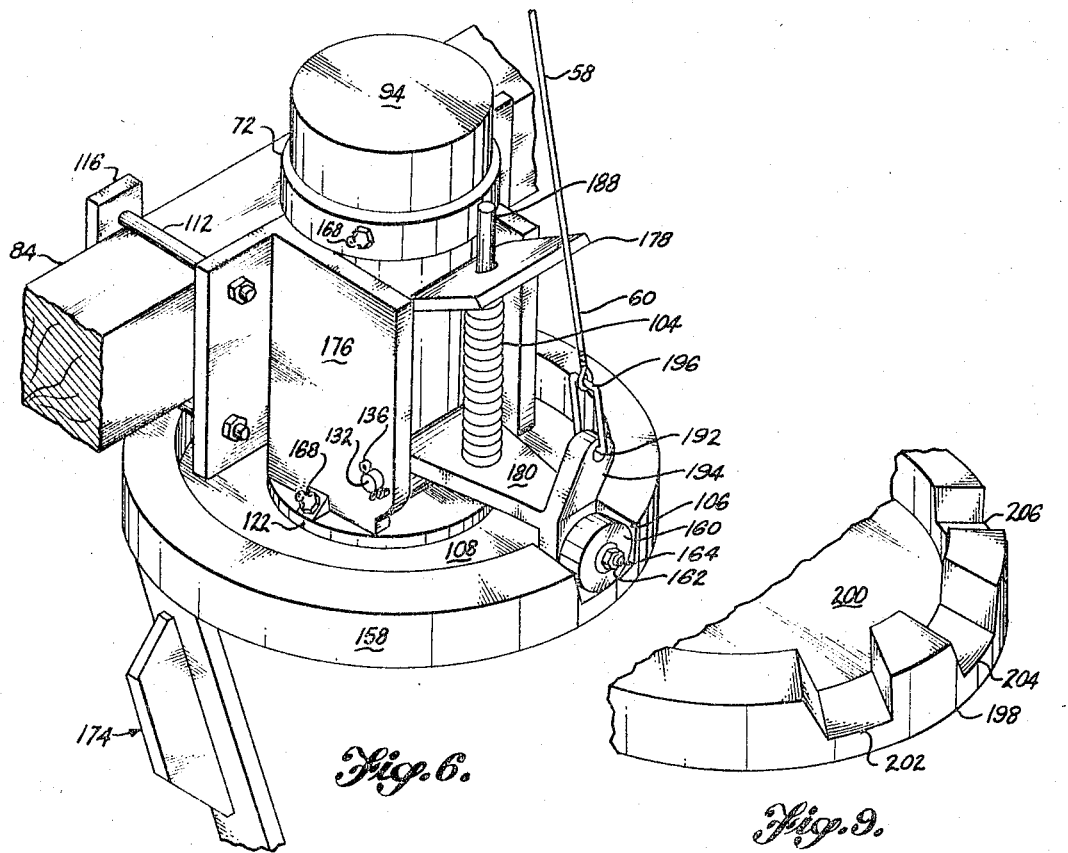
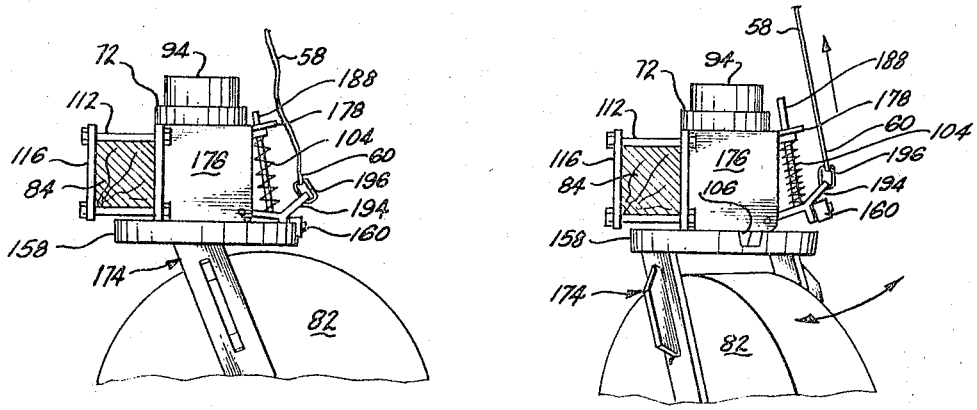
INVENTOR.
WILLIAM D. RITCHIE
BY *Smith & Mattern*
ATTORNEYS

United States Patent Office 3,324,956
Patented June 13, 1967

3,324,956
OPTIONALLY AND AUTOMATICALLY CONTROLLED REAR CASTER WHEELS ON PRIME MOVER TRAILED VEHICLE ASSEMBLIES
William D. Ritchie, Rte. 1, Prosser, Wash. 99350
Filed May 4, 1964, Ser. No. 364,510
8 Claims. (Cl. 172—386)

This invention relates to vehicles operated over irregular terrains such as construction and farm machines and more particularly to earth and vegetation working vehicles, wherein directional control for follow-on wheel and/or track assemblies is selectively undertaken.

The purpose of the invention is to provide a vehicle which is either a sole unit, a cooperating combination of units, or multiple vehicles operatively joined together, which may be held on a "steady course" regardless of changing terrains and more particularly may be kept from drifting down hill. Yet when such guidance is not wanted during turns and other like maneuvers of substantial directional changes, the vehicle, its units, or combination of units and/or vehicles is not restricted by the directional controls of the follow-on wheel or track assemblies because these restrictive components are automatically withdrawn from their operative positions upon changes of the overall vehicle assembly spaced configuration of components.

In the illustrated first embodiment of the invention an objective of the invention is to provide an assembly comprising a prime mover, such as a tractor, and a vegetation-working vehicle, such as a multiple row sugar beet topper, with one or more follow-on caster wheels, which are both directionally controlled during single and/or multiple-row harvesting to follow the field rows and especially to prevent downhill "drift" during side hill farming and yet uncontrolled during turning at field row ends, turns, decided curves and non-working transport periods between harvests.

In the illustrated first embodiment of the invention an objective of the invention is to provide an assembly comprising a prime mover such as a tractor, and a vegetation working vehicle, such as a multiple row sugar beet topper with one or more follow-on caster wheels which are constantly steerable to guide the assembly in the row direction without drifting.

Whereas, in the depicted second embodiment of the invention, an objective of the invention is to provide an assembly comprising a prime mover, such as a tractor, and a vegetation working vehicle, such as a multiple row sugar beet topper with one or more follow-on caster wheels which are locked in a selected position to guide the assembly in the direction of a given row without drifting.

In the presented embodiments of the invention, an objective of the invention is to provide components which are conveniently made, arranged, installed, inspected, serviced and operated on the assemblies shown and similar basic assemblies such as beet lifter-loaders, fertilizer-side-dressing machines and other vehicles which might otherwise tend to drift causing over-corrections of the direction of the prime mover.

As indicated in the illustrated embodiments of the invention, when the assembly comprises a prime mover and a semi-mounted follow-on vehicle which are interconnected with controllable components which cause alteration of the overall profile of the semi-mounted follow-on vehicle, then conversion from controlled to uncontrolled follow-on caster wheels occurs automatically as this overall profile is altered. Or, stated in another way, the invention is arranged so the active and inactive periods of the locking components are automatically changed to coincide with the active and inactive periods of the earth and/or vegetation working components of the follow-on vehicle.

The invention, as illustrated, briefly described, comprises: a prime mover; an earth and vegetation working vehicle arranged in trailing relation to the prime mover and rearwardly having at least one latched supporting caster wheel; operable joining structures between the prime mover and the working vehicle for selectively raising the forward portion of the vehicle relative to the ground thereby to preclude earth and vegetation work; linkage connected between the forward portion of the vehicle and the latched caster wheel and arranged to impart an unlatching force thereto to free the caster wheel to caster when the vehicle forward portion is elevated; force producing components insuring relatching of the caster wheel when the vehicle is returned to earth and vegetation working relation; and positioning components to control the directional setting of the caster wheel when latched.

This invention is illustrated in two principal embodiments inclusive of an additional modification in part of one embodiment in the accompanying drawings, wherein:

FIGURE 3 is a partial perspective view of the rotative mounting of a steerable caster wheel yoke located at the rear of the trailed vehicle, showing how its yoke mounted bearing plate receives a spring biased pawl during hydraulic system operations wherein the caster wheel is steered until the pawl is released upon movement of the latching controls;

FIGURE 4 is a schematic side view illustrating the engagement of the spring biased pawl or latch with the caster wheel yoke bearing plate;

FIGURE 5 is a schematic side view, like FIGURE 4, illustrating, however, the disengagement of the spring biased pawl or latch with the consequently freed caster wheel yoke bearing plate as the latching controls are tightened upon the raising of the forward portions of the trailer vehicle by actuators on the prime mover;

FIGURE 6 is a partial perspective view of a second embodiment showing a rotative mounting of a lockable caster wheel yoke located at the rear of the trailed vehicle indicating how its yoke mounted bearing plate receives a spring biased pawl during working row operations wherein the caster wheel is directionally locked until the pawl is released upon movement of the latching controls:

FIGURE 7 is a schematic side view illustrating the engagement of the spring biased pawl or latch with the caster wheel yoke bearing plate;

Figure 1:
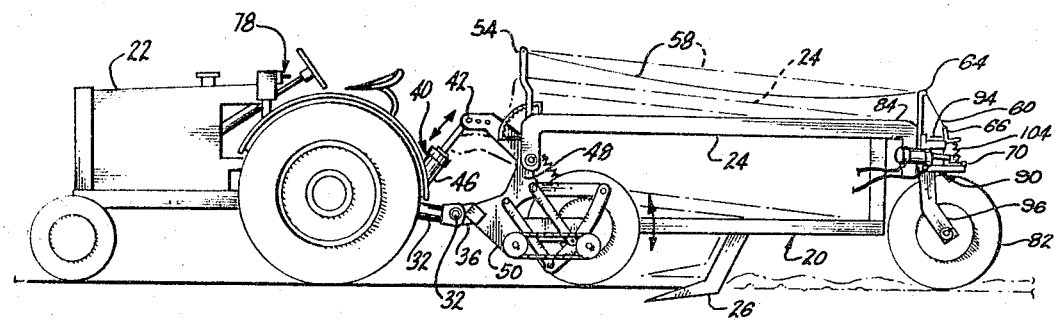
FIGURE 1 is a side view of the first embodiment assembly of a prime mover and a trailed vehicle with dotted lines indicating the raised non-working position of the trailed vehicle and the changes in the latching controls, with arrows indicating movements of both the raising actuator, and also the latching controls.
Figure 2:
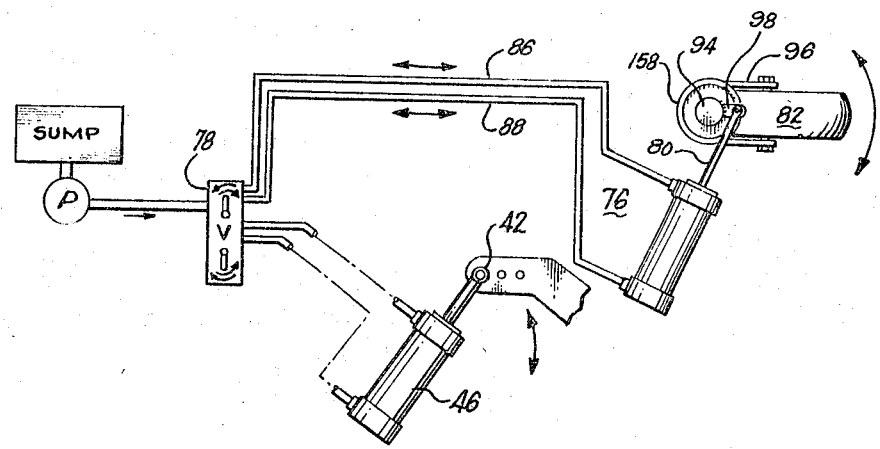
FIGURE 2 is a partial schematic view of the hydraulic steering system used to turn the caster wheel.

FIGURE 8 is a schematic side view, like FIGURE 7 illustrating, however, the disengagement of the spring biased pawl or latch with the consequently freed caster wheel yoke bearing plate as the latching controls are tightened upon the raising of the forward portions of the trailer vehicle by actuators on the prime mover; and FIGURE 9 is a partial perspective view of another caster wheel yoke bearing plate which is useful in the second embodiment to provide multiple directional settings of the locked caster wheel to meet operational requirements such as side hill maneuvers.

The embodiments of this invention, illustrated in these figures are concerned with adaptation of the invention to farm machinery 20 such as an assembly of a tractor 22 as the prime mover and a sugar beet topper 24, as the trailed vehicles, which is semi-supported by the tractor. However, the invention is easily adapted to all assemblies of farm machinery and construction machinery wherein there are identical or very similar operational requirements.

When the trailed vehicle is working earth and/or vegetation, the working tool or tools 26 are held on course by directional control of the prime mover 22. However, control through the prime mover 22 alone often proves unsatisfactory because the prime mover 22, such as a tractor, sometimes is required to move along in an angular relationship to the overall resulting directional movement of both the working tool 26 and the entire assembly 20. This angular, inefficient progress of the prime mover 22 is always certain to occur during side hill operations of such an assembly to prevent or to minimize downhill drift.

Therefore, this invention has been undertaken to be readily adapted to such earth and vegetation working assemblies 20 to counteract any tendencies of the assembly to operate inefficiently in respect to directional control. The invention makes the assembly 20 either completely steerable in the first embodiment illustrated in FIGURES 1 through 5 or substantially steerable in the second embodiment illustrated in FIGURES 6 through 9. Moreover, in both embodiments, the invention provides automatically for its successful working engagement at the same time the working tool 26 is in a position to be effective in earth and/or on vegetation.

Referring to FIGURE 1, the overall adaptation and automatic engagement of the invention is illustrated with dotted lines indicating non-working and non-engaging positions of the prime mover-trailed vehicle assembly 20. The tractor 22 is coupled to the earth or vegetation working vehicle at two different elevations. At a lower elevation, such coupling is undertaken by using a pivot pin assembly 32 joining together a towing bridle assembly 34 on the tractor 22 and pin insert tongues 36 on the trailed vehicle 24. At a higher elevation, a tilting actuator assembly 40 which is first mounted quite low on the tractor 22 is thereafter angularly raised and pivot pin 42 mounted to a higher placed pin insert tongue 44 on the trailed vehicle 24.

After a "working" period ceases of the combined tractor 22 and trailed vehicle such as a sugar beet topper 24, movement of the actuator assembly 40, which generally includes a hydraulic actuator 46, causes an arcuate movement of forward portions of the trailed vehicle 24. This occurs because the pivotal connection at the higher elevation is caused to rotate about the pivotal connection at the lower elevation, thus causing this arcuate movement of the forward end 48 of trailed vehicle 24. The angular position assumed by the trailed vehicle 24 provides the necessary and required clearance between the working tool 26 and the earth and/or vegetation as indicated by dotted lines in FIGURE 1.

It is this illustrated movement, or one similar to it such as the movement that would occur if a so-called "Ferguson System" was installed on the tractor wherein the actuator moves the lower members that are pivotally connected, or any other movement so similarly related to placing the working tool 26 in a non-working position, that is utilized to control the latching and unlatching of the steerable caster shown in the first embodiment and/or the lockable caster shown in the second embodiment. Attached to the rotated forward frame structure 50 or to some other forward location, is an anchoring and/or projecting structure 54 which likewise pivots forwardly. In so doing it advances a forward end 56 of a control cable 58 tightening such control cable 58 sufficiently to move its trailing cable end 60.

Because the cable end 60, after first slidably passing through an elevated guide structure 64, is thereafter attached to a lever and/or crank assembly 66, the latter is moved upon the cable's movement, causing unlatching of the respective locking pawls 70 and 72, respectively, of the different embodiments, referred to briefly as "steerable" and "lockable."

As indicated in FIGURES 1 through 5 in regard to the "steerable" caster embodiment, a hydraulic steering control assembly 76 is provided wherein the tractor operator at his location initiates valve lever 78 movements to direct the resulting movements of a steering hydraulic actuator 80 located at the steerable caster 82 mounted at the rear 84 of the trailed vehicle 24. Hydraulic lines 86, 88 operatively join together valve lever 78 and steering actuator 80.

Movements of steering actuator 80 always cause rotative movements of a cylindrical sleeve assembly 92 which rotatably surrounds the upstanding axle 94 of caster yoke 96 of rear caster wheel 82. This rotative movement occurs because the actuator 80 is pivotally attached to a projecting offset tongue 98 which in turn is firmly attached to the cylindrical sleeve assembly 92.

Whether or not such steering actuator 80 movements will cause like controlled movements of the rear caster wheel 82 within its captive rotative mounting assembly 102, which is secured to the rear framing 84 of the trailed working vehicle 24, is dependent upon the engagement of the spring 104 biased pawl 70 with the notched 106 rotary bearing plate 108, which is a part of the caster yoke 96 of rear caster wheel 84.

During "working" operations, the latch control cable 58 is slack and ineffective to overcome the spring 104 force so the pawl 70 remains engaged within notch 106 of bearing plate 108 and the turning torque applied to the cylindrical sleeve assembly 92 is effectively transferred to rear caster wheel 96. Conversely, the otherwise deflective forces directly applied to this caster wheel 96 are essentially nullified by the hydraulic steering control assembly 76 of the trailed working vehicle 24.

On the overall assembly of prime mover and trailed vehicle, the controlled and steerable caster wheel 96 in cooperation with all associated components initiates a directed motion of the overall assembly which eliminates any drifting tendencies and insures efficient operations from the standpoint of controlled direction earth and vegetation working operations.

Yet when "working" operations are terminated for the day or more often at the end of a directional run, the rear caster wheel is freed to perform its pure castering function, upon raising and removal of working tool 26 from the earth and/or vegetation by the operation of the tilting-joining actuator assembly 40. This occurs because, as shown previously, the latching control cable 58 is moved into a taut configuration pulling its trailing end 60 forward to cause resulting upward tilting motion of attached locking pawl 70 against the force of pawl spring 104.

FIGURES 3 and 4 show "working" positions of the overall components which are active in maintaining the steerable status of the rear caster wheel 82. Whereas FIGURE 5, indicates the unlatching and consequently "non working" position of these same components.

As indicated in FIGURE 3, the steering rear caster assembly 90 is bolted 112 to the rear frame 84 of the trailed vehicle utilizing its own bracket 114 and a separate backing bracket 116 placed on opposite sides of the rear frame 84. Its own bracket 114 is a part of the captive rotative mounting assembly 102, having a top bearing ring 118 and bottom bearing ring 120 and its bearing flange 122.

The use of spaced bearing rings 118, 120 in this way provides clearance for relative rotations of both a support assembly 124 for the spring biased pawl 70, which rotates with cylindrical sleeve assembly 92, and the offset tongue 98 which is joined both to cylindrical sleeve assembly 92 and steering actuator 80.

This pawl support assembly 124 has a radial arm 126 above to pivotally receive a cranking-lever 128 by using a combination of a pivot pin 130, upstanding pivot pin bearing members 132, 134, and a cotter pin 136. Upstanding leg 140 of cranking lever 128 receives the trailing end of latched control cable 58. The other leg 142 of cranking lever 128 in the "working" position parallels radial arm 126 of this pawl support assembly 124 until a hole 144 therein is reached.

Through this hole emerges top end 148 of pawl spring 104 which through its anchoring fastener 146 is pivotally pin secured by pin 150 to this other leg 142. The other end of spring 104 is anchored to a pivoting radial arm 154 which in turn is pin 156 mounted to two similar downwardly projecting positioners 152, supported by both the upper radial arm 126 and the lower offset tongue 98.

Therefore, when the "non-working" configuration of the entire combination or assembly occurs, the tightened and translated latching control cable 58 moves cranking-lever 128 which, in turn, raises pivoting radial arm 154 of pawl assembly 70 clearing it from engagement with the notched rotary bearing plate 108 of steerable rear caster assembly 90.

Upon return to the "working" configuration of the entire assembly, the slack latching control cable 58 is ineffective in overcoming the spring 104 force, and the pawl assembly 70 again is free to seek and to engage notch 106 in the rotary bearing plate 108.

During the pawl 70 "finding" or "seeking" sequence, friction is substantially reduced between it and flange 158 of bearing plate 108, by employing a roller follower 160 bolted 162 on an axle 164, which in turn is secured on the end of pivotal radial arm 154 of this pawl assembly. Also in several locations, grease fittings 168 are provided to reduce overall friction.

There are overall combinations or assemblies 20, which are operated over terrains and/or in such a manner that steering control of the latched caster wheel is not undertaken. Instead, during "working" operations the following rear caster wheel is locked in a set direction relative to the trailed vehicle and/or overall assembly. The embodiment of the invention adapted to this operational objective is illustrated in FIGURES 6, 7, 8 and 9, the latter figure indicating a modification of one part thereof providing pre-selected directional settings of the rear caster wheel.

As indicated in FIGURE 6, fewer parts are needed in this second embodiment. The upstanding axle 94 of caster yoke 96 rotates within a cylindrical bearing 172 which is secured to the rear caster mounting assembly 174. This assembly 174 is bolted 112 to the rear frame 84 of trailed vehicle 24, using a backing bracket 116.

The bolted-in-place caster mounting assembly 174 has like sides 176 extending beyond the cylindrical bearing 172. These sides 176 serve as mounting structure for both an above located secured plate 178 which is a mounting and abutment for pawl spring 104 and a below located pivotal radial arm 180 held in place by a pin 182 and cotter pin 184. The other end of the pawl spring 104 is confined to this pivotal radial arm 180 by an alignment rod 188 which is secured to the radial arm 180. This rod 188 extends upwardly and through a hole 192 in the above spring abutment plate 178, remaining always within the center of the coiling pawl spring 104, thereby insuring complete confinement of this spring 104.

Also the pivotal radial arm 180, at its end, receives an axle 164 which rotatably carries a roller follower 160 secured by bolt 162. This roller follower 160 reduces friction as the spring biased pawl assembly 72 seeks and engages notch 106 on rotating flange 158 of the rotary bearing plate 108. Also this same outward end of this pivotal radial arm 180 has an upstanding eyelet 192-tab 194 to receive a closure ring 196. The ring 196 in turn secures trailing end 60 of latching control cable 58 to pawl assembly 72.

Movement of control cable 58 occurs under the same circumstances and in a similar manner in respect to this so-called "lockable" direction embodiment as its movement occurs in respect to the so-called "steerable" direction embodiment. When the entire overall combination or assembly 20 is "working," pawl assembly 72 is "locking" the direction of the rear caster wheel 82, the spring 104 being effective when control cable 58 is slack. However, when the overall assembly 20 is "not working" earth and/or vegetation, then the taut cable 58, moved as shown in FIGURE 1, raises pawl assembly 72 out of notch 106 allowing the rear caster wheel 82 to be again freely castering upon movement of the combined prime mover 22 and trailed vehicle 24.

As stated before, use of the invention is particularly beneficial when side slope or side hill earth and/or vegetation operations are undertaken. Therefore, as shown in FIGURE 9, this "lockable" direction embodiment of the invention employs a flange 198 of a rotary bearing plate 200 which is notched at multiple locations. In FIGURE 9, three notches are shown. One notch 202 is placed left of a neutral point or straight away caster wheel 82 direction, also indicated by a second notch 204, and a third notch 206 is made to the right of the neutral notch 204. Operations on level terrain involve utilization of notch 204, whereas side hill "working" requires utilization of either notch 202 or 206, depending on the overall direction of travel.

By having these selective notches and optionally others (not shown) various directional headings of the locked direction caster wheel 82 are made available gaining some of the selectiveness which is unlimited in the first "steerable" embodiment of FIGURES 1 through 5. However, this gain in selectiveness may not be desirable because the tractor driver may have no indication as to which notch was engaged and some of the automatic selective operational advantages may be lost. If the wrong one is engaged, readjustment is necessary and is initiated by temporary directional changes of the tractor and the simultaneous tightening of the control cable to be released soon again. Visual or other indicators, not shown, could be installed, however, to aid the driver in knowing if the pawl is in a position to seek a correct directional locking notch while the entire assembly is undergoing a complete directional change at a row's end.

Whatever may be the ultimate specific arrangements of the components of this overall combination or assembly 20, there will remain the accomplishment of the operational purpose wherein "drift" caused by follow-on vehicles or portions thereof not following in line is substantially eliminated.

I claim:
1. The combination, comprising:
   a prime mover,
   an earth and vegetation working vehicle associated in trailing relation to said prime mover and rearwardly having at least one caster wheel in supporting relation,
   means including rotatable forward the frame structure between said prime mover and said vehicle for selectively raising the forward portion of said vehicle relative the ground to preclude earth and vegetation work, thereby,
   latch means between said vehicle and said caster wheel normally latching the wheel during working operations,
   linkage means associated between said rotatable forward frame structure and said latched caster wheel arranged to impart an unlatching force to said latch means to free said wheel to caster when said vehicle forward portion is elevated,
   and means insuring relatching of said caster wheel when said vehicle is returned to earth and vegetation working relation.

2. A combination of machinery units used to alter earth and vegetation, comprising:
   (a) a prime mover;
   (b) an earth and vegetation working vehicle secured to the prime mover in trailing relation thereto and equipped at its rear with at least one latchable supporting caster wheel;
   (c) a rotatable actuator connected between the prime mover and the working vehicle to raise the forward portion of the vehicle relative to the ground level thereby to preclude earth and vegetation work; and
   (d) a control latching assembly extending between the rotatable actuator and the latchable supporting caster wheel to free the wheel when the forward portion of the working vehicle is elevated and to relatch the wheel when the forward portion of the working vehicle is lowered.

3. A machine used to alter earth and vegetation comprising:
   (a) a motive power unit;
   (b) an earth and vegetation working unit;
   (c) an actuated connecting assembly including rotatable forward frame structure between the motive and working units to join them together and to move the working unit into and out of a working position;
   (d) a caster rotary assembly at the rear of the working unit; and
   (e) a directional locking assembly, actuated by the relative movements between the motive and working units upon rotation of the rotatable forward frame structure of said actuated connecting assembly, to directionally lock and unlock the caster rotary assembly during working and non-working positions respectively of the working unit.

4. A machine used to alter earth and vegetation, as claimed in claim 3, wherein the directional locking assembly comprises:
   (a) a rotary positioner on the caster rotary assembly;
   (b) a spring biased pawl assembly mounted on stationary structure of the caster rotary assembly;
   (c) a restrictive structure on the rotary positioner to be intercepted and held by the spring biased pawl assembly; and
   (d) a pull cable assembly so connected to the rotatable forward frame structure of the motive-working unit machine and the spring biased pawl assembly whereupon operation of the actuated connecting assembly changing the relative locations of the motive and working units, movement of the pull cable assembly is caused thereby freeing the spring biased pawl assembly from the restrictive structure on the rotary positioner of the caster rotary assembly.

5. A machine used to alter earth and vegetation, comprising:
   (a) a motive power unit;
   (b) an earth and vegetation working unit;
   (c) an actuatable connecting assembly, including remotely operable actuation means between the motive and working units to join them together and to move the working unit into and out of earth and vegetation working position;
   (d) a steerable caster rotary assembly and remotely operable steering means associated therewith at the rear of the working unit; and
   (e) a steering means locking assembly, including means to actuate the same upon relative movements between the motive and working units upon actuation of the connecting assembly; said locking assembly being operatively associated with the steerable rotary assembly; and said locking assembly actuation means being operable to lock the steering means locking assembly when the working unit is in working position, and operable to unlock the said locking assembly when the working unit is out of working position to permit free castering of the caster rotary assembly.

6. A machine used to alter earth and vegetation, as claimed in claim 5, wherein the steering means locking assembly comprises:
   (a) a rotatable structure of the caster rotary assembly;
   (b) a positioner on the rotatable structure of the caster rotary assembly;
   (c) a rotatable sleeve structure of the caster rotary assembly;
   (d) a spring biased follower assembly mounted on the rotatable sleeve structure of the caster rotary assembly;
   (e) a steering actuator connected to the rotatable sleeve structure and secured to nonrotatable structure of the working unit; and
   (f) a control assembly connected both to the working unit and to the spring biased follower assembly, whereupon the spring biased follower remains nonrotatively engaged relative to the positioner so the steering actuator is effective in directionally controlling the rotary assembly during the working position of the working unit, yet upon movement of the connecting assembly placing the working unit out of working position, the control assembly is automatically moved and frees the spring biased follower from engagement with the positioner and the rotary assembly casters freely.

7. A lockable caster rotary assembly for attachment to the rear of earth and vegetation working machinery to avoid downhill drifting, comprising:
   (a) a captive rotative bearing sleeve and bracket for attachment to the working machinery;
   (b) a caster rotary assembly positioned in the captive bearing sleeve and including a notched member movable therewith;
   (c) a roller latching means secured to the bracket and arranged to contact the notched member of the rotatable wheel assembly; and
   (d) a latch control assembly connected to the latching means and to be fastened to the working machinery in a location to be moved upon positional changes of the working machinery to adjust the latching means into and out of engagement with the caster rotary assembly.

8. A steerable caster rotary assembly for attachment to the follow-on frame portions of earth and vegetation working machinery to maintain overall directional control, comprising:
   (a) a caster rotary assembly including a notched member movable therewith;
   (b) a sleeve rotatably positioned on the caster rotary assembly;
   (c) a captive bearing sleeve and bracket for surrounding the rotatable sleeve on the caster rotary assembly and holding them together for attachment to the working machinery;
   (d) an actuator receiving structure on the rotatable sleeve; and
   (e) a roller latching means secured to the rotatable sleeve and arranged for engagement with the notched member of the caster rotary assembly.

References Cited

UNITED STATES PATENTS

| | | | |
|---|---|---|---|
| 1,898,353 | 2/1933 | Everett et al. | 172—291 X |
| 2,608,145 | 8/1952 | Knapp | 172—319 |
| 2,732,781 | 1/1956 | Coviello | 172—386 X |
| 2,786,589 | 3/1957 | Garrett | 172—443 X |

ABRAHAM G. STONE, *Primary Examiner.*

J. R. OAKS, *Assistant Examiner.*